United States Patent [19]

Ace

[11] Patent Number: 4,921,341

[45] Date of Patent: May 1, 1990

[54] OPTHALMIC LENS SAFETY LINER

[76] Inventor: Ronald S. Ace, 5200 J. Philadelphia Way, Lanham, Md. 20706

[21] Appl. No.: 183,078

[22] Filed: Apr. 19, 1988

[51] Int. Cl.$^5$ .............................................. G02C 1/00
[52] U.S. Cl. ...................................... 351/86; 351/154; 351/95
[58] Field of Search ................ 351/86, 154, 159, 166, 351/95–102

[56] References Cited

U.S. PATENT DOCUMENTS

| | | |
|---|---|---|
| 1,143,502 | 6/1915 | Burton . |
| 1,785,929 | 12/1930 | Bouchard . |
| 3,829,201 | 8/1974 | Whiting ................................ 351/154 |
| 4,340,282 | 7/1982 | Murakami ........................... 351/154 |
| 4,679,918 | 7/1987 | Ace ...................................... 351/163 |

FOREIGN PATENT DOCUMENTS 37579  4/1886  Fed. Rep. of Germany .

Primary Examiner—Rodney B. Bovernick

[57] ABSTRACT

A safety lens liner adapted to be mounted on the peripheral edge of an eyeglass lens is disclosed. The liner is shaped to engage a groove on the rim of an eyeglass frame to secure the lens in place. The lens incorporates a circumferential groove on its peripheral edge, which receives a tongue extending inwardly from the inner surface of said tongue, for positioning the tongue on the peripheral edge of the bead.

9 Claims, 1 Drawing Sheet

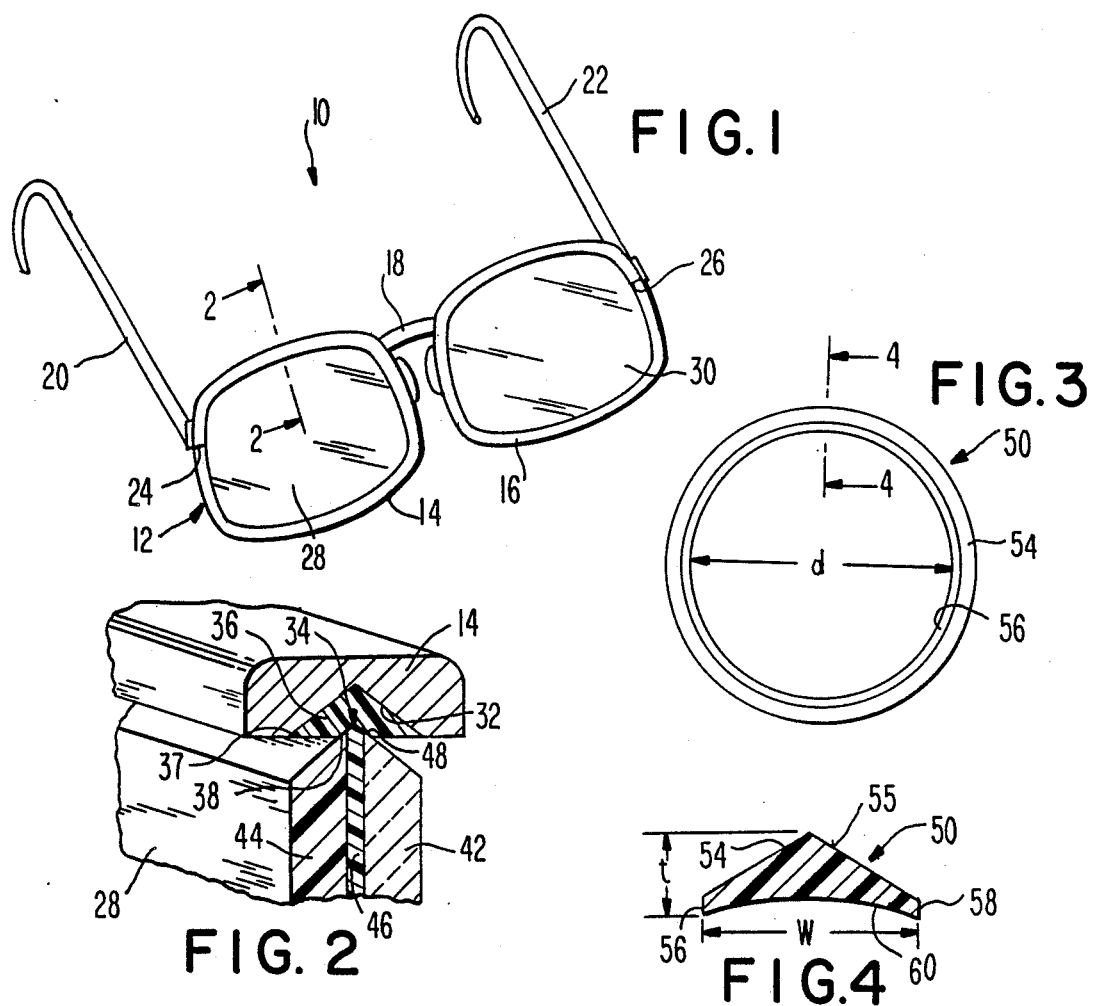
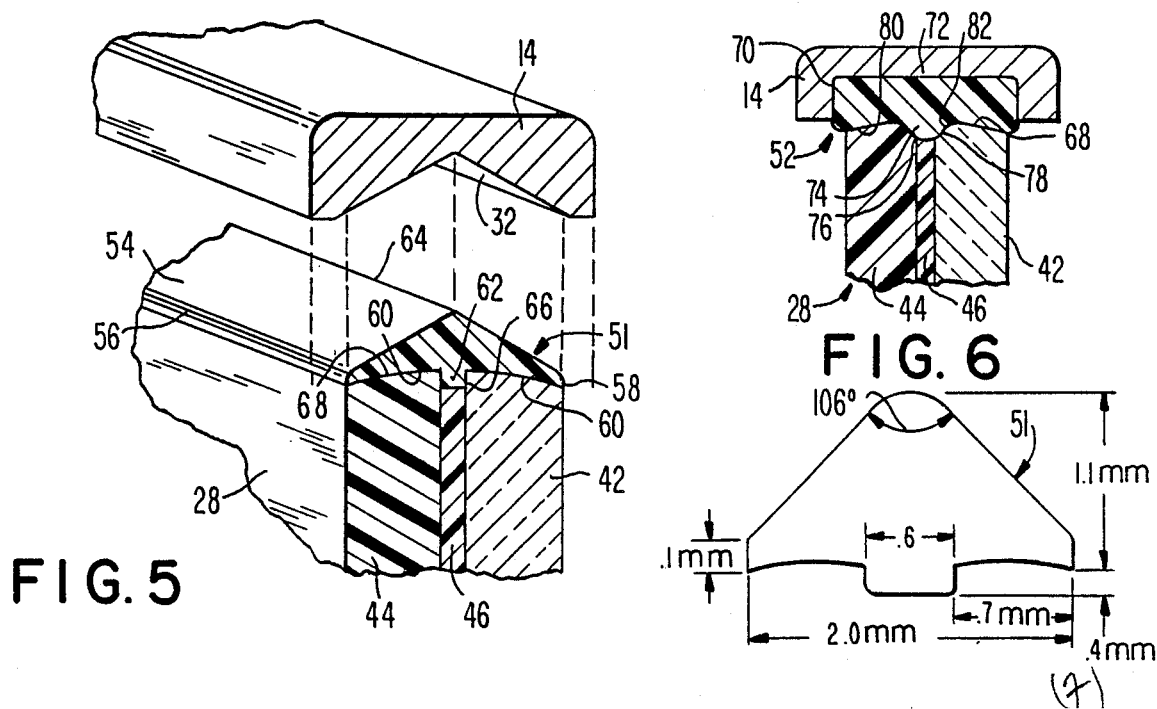

OPTHALMIC LENS SAFETY LINER

BACKGROUND OF THE INVENTION

The present invention relates, in general, to safety liners for lenses, and more particularly, to liners for mounting glass or glass/plastic laminated ophthalmic lenses in metal eyeglass frames.

Although glass ophthalmic lens are extremely popular and have many advantageous features, one undesirable characteristic is that when such a lens is formed with a thin peripheral edge and is mounted in the rim portion of a rigid metal frame, the resulting eyeglass product becomes very prone to dangerous lens edge chipping and fracturing. The reason is that whenever glass is ground to a thin and mechanically weakened edge, as occurs with a thinly edged plus-powered lens or a low powered thin glass lens, and then the lens is tightly compressed circumferentially into a metal frame, the hard materials of the lens and frame do not uniformly contact each other around their entire circumferences. As a result, high physical stresses can be induced into the glass at various points of contact around the lens circumference. Such point contact stresses cause dangerous fragility and unpredictable durability, since even a slight impact or a small flexing of the metal frame can often destroy the lens and can cause sharp slivers of glass to be ejected from the lens toward the wearer's eye. On the other hand, if thin glass lenses are inserted into plastic frames, excellent safety performance is achieved as a result of the plastic frame's relatively low hardness and its ability to naturally conform to slight irregularities in the glass edges. However, many eyeglass wearers prefer metal frames, so it is important to make their use as safe as possible.

Glass to plastic laminated ophthalmic lenses have recently been developed, and are disclosed in U.S. Pat. No. 4,679,918. Such lenses have numerous advantages over glass lenses, in that they combine the best properties of both materials so as to produce a light weight but scratch resistant lens. But such laminated composite lenses also suffer the intrinsic and undesirable chipping and fracturing characteristics of the all-glass ophthalmic lens having a thin edge, when the composite lens is mounted in a metal frame. That is, the thin glass layer of the laminated composite lens is still subject to chipping or even fracture because of stresses imposed on the glass portion of the lens by a metal frame.

It has been proposed to overcome the problem encountered with thin-edged glass ophthalmic lenses mounted in metal frame rims by lining the rim groove which receives the lens edge with a soft material. For example, a resilient polyethylene plastic liner has been proposed for metal frame rims in order to simulate the excellent performance obtained with all-plastic frames. Unfortunately, however, the use of frame rim liners has been unsatisfactory. The frame rim liner, it has been found, must be relatively thick in order to simulate the conformity and resilience of an all-plastic frame, but the limited depth of the groove in virtually all metal frame rims presents serious difficulties. Almost all rim groove depths are in the range of 0.5 to 0.8 mm deep, and this standard depth is ordinarily sufficient to safely retain a lens when the peripheral edge of the lens is shaped to match that of the frame rim groove. However, if the rim groove is V-shaped with a maximum depth of 0.75 mm, and a perfectly matched liner of about 0.4 mm thickness is inserted into the V-shaped groove, the liner reduces the effective lens retaining groove depth to about 0.25 mm (or 0.010 inch). The result of this reduction in the effective groove depth is a consequent reduction in the lens retention ability of the frame, and this renders the eyeglass very unsafe because the entire lens can be easily unseated from the frame with only a slight force or impact. Furthermore, a liner of 0.4 mm thickness is insufficient to adequately simulate an all-plastic frame, for the metal frame rim still imparts pressure through such a thin liner to produce stress contact points on the glass when the rim is closed around the lens, and thus fails to provide the safety and durability that is normally expected from an all plastic frame. Thus, even if the frame liner were to provide adequate retention characteristics, it still would not solve the problem of glass fracture.

Accordingly, it is clear that no remedy is presently available for overcoming the problems observed in the mounting of delicate, thin glass lenses in the rims of hard metal frames. Furthermore, these problems are not limited to thin glass lenses, but to glass of all thicknesses when tightly mounted in metal frames without liners, for such lenses are generally less safe and more fragile than their counterparts mounted in plastic frames. Highly skilled opticians in their daily practice routinely tighten the rims of metal frames around glass lenses to a tension just short of the point where the glass will chip. They have learned from years of experience to stop tightening just before damage occurs, but such practices remain dangerous because such tightening of the frame produces stresses which can result in fractures at unpredictable times. A slight frame flexure, a thermal shock, or a mild impact can cause chipping, and even a standard polariscopic inspection for lens stress cannot predict when that might happen. Such mountings are one of the causes of the many thousands of glass lens that are broken each year. Metal frames with thin liners provide small and insufficient improvements in safety, while frames with thicker liners cause unsafe lens retention problems.

SUMMARY OF THE INVENTION

The present invention provides a practical and inexpensive solution to the foregoing problems and provides a remedy for all of the fragility safety problems outlined above. Equally importantly, this solution is achieved without the need to make alterations to the eyeglass frames. This is accomplished through the provision of a lens mounting safety liner which is in the form of an elastic loop, or ring, which is sized to fit snugly around an eyeglass lens and to be elastically retained around the edge of the lens. The liner is made of a resilient, elastic material that can be stretched to fit around the lens, and its outer surface is shaped to engage the inside groove conventionally provided in a metal eyeglass frame. The liner preferably has a slightly concave base wall having a central, inwardly extending bead, or tongue, which preferably extends circumferentially completely around the interior of the liner ring. The outer peripheral edge of the lens is shaped to engage the concave base wall of the liner, and further includes a groove which accepts the interior circumferential bead formed on the liner.

The ophthalmic lens which is to receive the safety liner is first edged, using a conventional, nonbeveled, abrasive edging wheel of the type used to edge so-called "rimless" eyeglass lenses. This edging is done to produce essentially a flat peripheral edge surface for the lens that is substantially parallel to the lens optical axis, even though the lens is to be mounted in a metal frame rim having a conventional V-beveled groove. The lens is edged to a diameter that will allow it to pass all the way through the surrounding frame rim, even when the frame is closed, although ordinarily a lens edged in this manner would be considered too small for the frame and would be rejected. The lens is then grooved, using a standard grooving machine to cut a narrow groove approximately 0.5 mm deep all the way around the circumference of the lens. The elastic ring-shaped liner is then stretched to fit around the entire lens circumference with the liner bead, or tongue, fitting into the lens groove to properly position the liner on the lens. The lens groove is particularly helpful in retaining the liner in place when the lens shape takes on a three dimensional curve, as is often the case with high base curve lenses or executive bifocals. When in position, the outer surface of the liner restores a generally V-shaped peripheral outer edge to the lens so that it can then be mounted in the frame in the ordinary manner, using the usual screw tensioning to close the frame around the lens. For added lens retention, the liner may be adhesively secured to the lens by a cyanoacrylate type of adhesive. This adhesive not only increases frame retention of the lens but also provides a better index match of the liner to the lens to make the liner less visible.

The cross-sectional shape of the liner is selected to approximate that of the frame groove so that the outer surface wall of the liner engages the groove snugly. The liner usually is generally triangular in cross-section, because most frames have a beveled groove, but other cross-sectional shapes can be used. The liner of the present invention is constructed of an elastomeric material which has a high heat resistance and is immune to common solvents so that it will be long lasting, and which is resilient so that it will accommodate variations in contact pressure around the circumference of the lens so as to prevent damage to the lens. Preferably the elastomeric material is optically clear, but this is not essential.

The liner of the present invention not only provides a significant safety feature for eyeglass lenses, but greatly facilitates the fitting of a lens into a metal frame, allowing the frame to securely hold the lens in a manner that is far superior to any prior frame liners. Furthermore, by providing an optically clear liner material, the liner does not adversely affect the cosmetic appearance of the lens. In addition, the liner provides a unique and simple way to enlarge the size of a lens if, for example, it has been ground slightly too small for a desired frame. Thus, the lens liner can be used to reconstruct the correct lens diameter, even for plastic frames, thereby reducing spoilage in the manufacturing process.

BRIEF DESCRIPTION OF THE DRAWINGS

The foregoing and additional objects, features and advantages of the present invention will become apparent to those of skill in the art from the following detailed description of preferred embodiments, taken in conjunction with the accompanying drawings, in which:

FIG. 1 is a perspective view of an eyeglass frame containing a pair of lenses and incorporating a frame rim liner;

FIG. 2 is a cross sectional view taken in perspective along lines 2—2 of FIG. 1;

FIG. 3 is a side view of an unmounted elastomeric safety liner in accordance with one embodiment of the present invention;

FIG. 4 is a cross sectional view of the safety liner taken along lines 4—4 of FIG. 3;

FIG. 5 is an exploded sectional view of an eyeglass lens and frame rim incorporating a second embodiment of the safety liner of the present invention;

FIG. 6 is an enlarged, cross-sectional view of the safety liner of FIG. 5; and

FIG. 7 is a cross sectional view of an assembled eyeglass frame rim and lens incorporating a third embodiment of the safety liner of the present invention.

DESCRIPTION OF PREFERRED EMBODIMENTS

Turning now to a more detailed consideration of the present invention, there is illustrated in FIG. 1 a conventional eyeglass frame 10 including a front piece 12, formed by a pair of rims 14 and 16 and joined by a bridge 18, and a pair of temple pieces 20 and 22 secured to rims 14 and 16, respectively. In conventional manner, the rims each are formed by a continuous metal strip, the opposite ends of which abut at joints 24 and 26, respectively. The abutting ends are conventionally held together by means of small screws (not shown) which allow the rims to be opened for insertion of lenses such as those illustrated at 28 and 30, respectively. After insertion of the lens within the rims, the opposite ends of the rim at the joints 24 and 26 are pulled together by the screws to tighten the rims around the circumferential edge of the lenses to secure the lens in place. Conventionally, the frame rims 14 and 16 are formed with an internal groove 32 which may be V-shaped is illustrated in FIG. 2. This V-shaped, or beveled, groove receives the outer peripheral edge of the lens generally indicated at 34, and the rim is tightened down to securely hold the lens. Usually the lens edge is beveled or otherwise shaped to match the shape of the rim groove so as to obtain a secure fit and to insure that the lens will be retained in the rim even when the lens is impacted or the frame is twisted.

Although a lens can be edge ground quite precisely to closely match the nominal shape of the metal rim, through the use of frame patterns, the rim is subject to bending and other distortions either in manufacturing or in later handling. Furthermore, there usually are some very slight variations in the shape of the edge of the glass so that when the glass and the rim are mated together and the rim is tightened down onto the lens, there will be areas where the rim does not quite touch the edge of the glass lens, and there will be other areas where the rim presses too tightly against the glass. These variations in contact pressure produce stresses in the glass and subject the lens to easy breakage and chipping. This is particularly a problem when the glass is very thin, as is the case with nonprescription lenses, with high positive power lenses, or with the glass layer of glass/plastic laminated lenses of the type described in U.S. Pat. No. 4,679,918, issued to the present applicant. Highly skilled opticians have learned from years of experience how far to tighten metal frames onto a glass lens so as to avoid most damage, but even so, it is not possible to predict with any accuracy whether or when a fracture will take place. A slight frame flexure, a thermal shock, or a mild impact can cause such prestressed lenses to fracture or chip.

In an attempt to prevent such problems, the industry has generally accepted a standard of glass thickness of about 2 mm at the thinnest edge point, or 3 mm for industrial safety lenses. However, no minimum edge thickness is specified, so a nonindustrial safety prescription lens may be produced with an edge as thin as the prescription requires for the size of the selected lens, although deviations from the 2 mm minimum edge thickness standard are infrequent. Furthermore, when a lens is edged to conform it to the shape of the frame in which it is to be mounted, this edging is done on an edger machine which uses a special diamond-impregnated wheel which grinds away the excess circumference of the lens while following a predetermined geometric pattern. This diamond grinding, or edging process, might be better described as a microcracking process, because a microscopic inspection of a glass lens peripheral edge reveals millions of microfissures or cracks after edging. These microcracks impart to the glass lens countless weak spots which can initiate a major chipping or cracking under stress.

Many techniques for strengthening the glass to prevent chipping and cracking problems have been attempted, including heat tempering, chemical tempering, edge polishing, fire polishing and chemically etching the lens edges. These techniques have proven to be insufficient to impart reliable strength to glass lens edges when they interface with metal frames, particularly when the glass is thin, as is the case with a glass/plastic laminate lens. Furthermore, all of these glass strengthening processes are either inappropriate or impractical for glass once it has been laminated to plastic to make lenses of the type described in the aforementioned patent.

One method that has been used in the prior art to overcome the foregoing problems is illustrated in FIG. 2, wherein a resilient liner such as that illustrated at 36 is placed in the groove 32 of the frame. However, such frame liners must be relatively thick in order to overcome the problems of stress fracture and breakage discussed above, and because the thickness of such a liner is governed by, and limited by, the depth of the frame groove 32, such liners have proved to be unsatisfactory. Almost all frame groove depths are in the range of 0.5 to 0.8 mm deep, and this ordinarily is sufficient to safely retain a lens. However, when a liner such as liner 36 is inserted into the groove, it significantly reduces the effective depth of the groove, even if it is perfectly shaped to match the bevel of the groove 32. Thus, for example, the liner 36 includes an upper surface 37, which is shaped to engage the rim groove surface 32, and includes a lower surface 38 which is also V-shaped to form a secondary groove which now receives the peripheral edge 34 of the lens 28. If the thickness of liner 36 between surfaces 37 and 38 is 0.4 mm, it reduces the effective lens retaining groove depth of the usual metal frame rim from about 0.65 mm to about 0.25 mm so that the peripheral edge 34 of lens 28 is insecure. This reduction in lens retention makes the eyeglasses very unsafe because the entire lens can be unseated from the frame with only a slight force. Furthermore, a liner 0.4 mm thick is too thin to adequately prevent chipping or fracturing of the thin glass layer, so that the liner creates additional problems of retention without fully solving the problem of chipping or fracturing. A further problem that is encountered with such liners is that they are extremely difficult to position in the rim and to retain in place while the lens is being placed within the rim and the rim is being tightened around the lens.

The lens 28 is illustrated in FIG. 2 as being a composite lens of the type described in Pat. No. 4,679,918, and thus includes a front layer 42 of glass, an ocular layer 44 of optical grade plastic, and an intermediate elastomeric adhesive layer 46 which bonds the glass and plastic layers together. As illustrated, when the peripheral edge 34 of the lens 28 is beveled to match the bevel of the metal frame, the edging process which produces the bevel also produces a very thin edge 48 at the inner surface of the glass layer. This thin edge is produced even if the overall edge thickness of the lens 28 is relatively large, and it is this thin edge 48 that produces cracking and chipping problems in a laminated ophthalmic lens. Nonlaminated lenses which utilize a very thin glass layer have similar problems when the peripheral edge is made very thin due to the edge grinding process.

The foregoing problems are overcome, in accordance with the present invention, by the provision of a safety lens liner such as that generally indicated at 50 in FIGS. 3 and 4 and illustrated in modified form at 51 in FIGS. 5 and 6, and at 52 in FIG. 7. The safety lens liners 50–52 are each formed in a closed loop, or ring, as illustrated in FIG. 3 which preferably is smaller than the lens on which it is to be mounted. The safety liner fits on the peripheral edge 34 of the lens itself, rather than being mounted in the frame rim groove, and thus is carried with the lens to facilitate mounting the combinations lens and liner in the frame rim. The liner is constructed of an elastic material, preferably a material with at least 100% elongation, so that one size liner will fit virtually all lenses, although in the alternative the liner may easily be made in various sizes. Preferably, each of the rings 50, 51 and 52 has a nominal diameter d of approximately 45 mm and in cross section has a width w of about 2 mm and a thickness t of about 1 mm, as illustrated in FIGS. 4 and 6.

The safety liner ring 50 has a cross sectional shape which is shaped to fit snugly into the groove formed in rim 14 of the frame to which it is to be assembled, and in the embodiment illustrated in FIG. 4, includes a beveled outer surface formed by walls 54 and 55 which engage corresponding surfaces of the beveled groove 32 of rim 14. The outer walls 54 and 55 merge with liner side walls 56 and 58 which, in turn, intersect a bottom or inner wall 60 which is shaped to engage the corresponding peripheral edge of the eyeglass lens to which it is to be mounted. The inner wall usually is flat, but as illustrated in FIG. 4, the inner wall 60 can be slightly concave if the peripheral lens edge is slightly convex. The liner 50 thus is generally triangular in shape and snugly and elastically grips the outer peripheral edge of an eyeglass lens.

The safety lens liner 50 may be constructed of a castable elastomeric polyurethane material which may be prepared using the following formulation:

TABLE I

| Formulation Component | Weight (grams) |
| --- | --- |
| Aliphatic diisocyanate, Desmodur W from Mobay Chemical) | 1342 |
| Polytetramethylene Glycol (1000 W) | 1633 |
| Trimethylol Propane | 199 |
| Butanediol | 100 |
| Dimethyl tin dilaurate catalyst | 100 ppm |

TABLE I-continued

| Formulation Component | Weight (grams) |
|---|---|
| (add UV inhibitor if desired) | |

The safety liner 50 is manufactured by pouring the liquid elastomeric material into a suitably shaped mold and curing the elastomer in conventional manner. The resulting liner ring is simple to make, is extremely low in cost, and has the following characteristics:

TABLE II

| Characteristic | Description |
|---|---|
| Appearance | water clear, hard, stiff |
| Hardness (shore A) | 94 |
| Hardness (shore D) | 52 |
| Elongation at break | 135% |
| Tensile strength (psi) | 3300 |
| Bashore rebound | 45% |
| 1 hour water boil test | No degradation |
| 1 hour Carbitol solvent | No degradation |
| 1 hour alcohol, acetone | No degradation |
| Lens-dye "tint test" | Tints slightly faster than CR-39 lenses |
| Lens-dye removal rate | "Neutralizes" colorless faster than CR-39 lenses |

The lens liner constructed from the foregoing material has a high resistance to sunlight aging, remaining water clear throughout its life, has a high heat resistance over a range of $-40°$ F. to $+240°$ F. in air or water, and is immune to common solvents, such as alcohol, acetone, tint neutralizer, and the like.

Another preferred material for the lens liner is a polyether-polyurethane elastomer such as Pellethane No. 2103-90AEF, marketed by Dow Chemical Co. This elastomer, which is produced by reactive components including polytetramethylene glycol ether, is an optically clear material having a hardness of 90-94 Shore "A", an elongation of 560%, and is highly resistant to damage by various solvents. The material can be extruded or injection molded to form the lens liner of the invention.

The liner illustrated in FIG. 4 is easily placed on the outer peripheral edge of a lens which is edge ground to have a generally flat or slightly convex surface, as viewed in cross section, with the base or bottom wall of the liner being shaped to match the shape of the outer peripheral edge surface of the lens. The liner is placed on the lens preferably in alignment with the front surface thereof, with the elasticity of the liner holding it in place. The lens and liner combination can then be positioned in the groove of rim 14 (or 16) and the rim tightened down onto the liner to thereby hold the lens in place. Because it is not necessary to provide a sharp edge on the glass in order to retain the lens in the rim, stress fractures are greatly reduced. Furthermore, the liner can be made relatively thick so as to provide a significant cushioning effect between the metal frame and the peripheral edge of the lens, and as a result chipping and fracturing of the glass lens is significantly reduced. The liner is easy to handle, since it doesn't have to be mounted to the inner surface of the rim, and the combination of the lens and liner greatly facilitates mounting of the lens in the rim.

A preferred form of the invention is illustrated in FIG. 5, wherein the safety liner generally indicated at 51 includes the features of the liner of FIG. 4, but in addition includes an inwardly extending bead, or tongue, 62 depending from the inner wall surface 60.

This inner bead preferably is at the center of the wall surface 60, and is continuous around the inner circumference of the ring formed by the liner. Alternatively, the tongue may be discontinuous, and formed in segments around the interior surface 60. When the liner is generally triangular, the tongue preferably is located directly below the peak, or apex, 64 formed by the meeting of the top walls 54 and 55 of the liner, but if desired, the tongue may be offset to one side or the other to accommodate various lens thicknesses and configurations.

The tongue 62 is shaped and located to engage a corresponding groove 66 formed in the outer peripheral edge 68 of the eyeglass lens 28, as illustrated in FIG. 5. The lens groove may be formed at any location across the width of the peripheral edge 68, but when the lens 28 is a composite glass/plastic laminated lens, preferably the groove 66 is formed in the intermediate layer 46 between the glass layer 42 and the plastic layer 44. The peripheral edge 68 is here shown as being nonbeveled to receive the inner surface 60 of the liner 51. The outer walls 54 and 55 of the liner are shaped to fit the groove 32 formed in the rim 14, as previously explained, and thus are shown as being generally triangular or beveled, in the embodiment of FIG. 5.

The dimensions of a most preferred embodiment of the invention are shown on the cross-sectional view of liner 51 in FIG. 6. In FIG. 7, however, the rim 14 is shown to have a generally rectangular groove 70 and accordingly the upper wall 72 of liner 52 is squared off and provides a generally rectangular liner, in the manner illustrated.

The liner illustrated in FIG. 7 incorporates an inwardly extending tongue 74 which preferably extends continuously around the inner circumference of the liner, but which may be segmented, if desired. In this embodiment, the tongue 74 is formed with sloping side walls 76 and 78 which cause the tongue to taper outwardly toward the liner inner wall 80. The corresponding groove 82 formed in the outer periphery of edge 68 of the lens 28 is wider than the intermediate layer 46 and is tapered outwardly so as to bevel the inner surface edges of the glass and plastic layers 42 and 44, thereby eliminating the sharp edge of the glass layer at its inner surface, which was subject to cracking and chipping, and which was a cause of stress fracturing of the glass lens.

The lens 28 illustrated in the drawings is a composite lens; however, it will be evident that both all plastic and all glass lenses may also be shaped at their peripheral edges to receive the safety liner of the present invention so that the lens can be secured in a metal frame with a significantly reduced tendency to chip and fracture. Furthermore, glass and plastic lenses may be edged with nonbeveled, grooved peripheral edges as illustrated to receive liners for diameter adjustment to permit a lens that would normally be considered undersize to fit into a frame rim of either metal or plastic. Thus the liner can serve as an extension of the lens to increase the lens radius by the thickness of the liner. The tongue provided in the embodiments of FIGS. 5 and 7 provides a tongue and groove connection between the liner and the lens to secure the liner in a lateral direction (as viewed in FIGS. 5 and 7) so that it will remain on, and aligned with, the lens. This not only holds the liner in place when the lens is curved in three dimensions, so as to facilitate mounting of the lens in the frame, but also helps to retain the lens in the rim even under impact.

Normally, the combination of the groove in the rim and the groove in the lens with the liner shaped as in FIGS. 5 or 7 will enable the liner to secure the lens in the frame; however, if desired, an adhesive may be used between the liner and the lens to hold the liner firmly in place.

To assemble a lens in a frame, the lens is edged following the geometric pattern of the frame rim, using a nonbeveled, or rimless, abrasive edging wheel so that after edging the lens can be passed through the closed frame. The rimless, or nonbeveled edge is illustrated at 68 in FIGS. 5 and 7, and at any given diameter is the same size, or slightly smaller, than the corresponding dimension of the rim. Using a standard grooving machine a circumferentially extending narrow groove such as that illustrated at 66 is cut in the peripheral edge 68 approximately 0.55 mm deep all the way around the circumference of the previously edged lens. The safety lens liner 51 (or 52) is then elastically stretched and positioned on the peripheral wall 68 of the lens with the inwardly extending tongue 62 (or 74) extending into the groove formed in the lens. At this point, the rimless-edged lens is effectively transformed into a lens having a shaped edge which can then engage the correspondingly-shaped groove formed in the rim 14. In the case of the embodiment of FIG. 5, the outer walls 54 and 55 provide a triangular, or beveled, outer surface, which in the embodiment of FIG. 7, the liner provides a rectangular outer surface which engages a correspondingly-shaped rectangular groove in rim 14. The lens may then be positioned in the rim 14 and the rim closed by means of the usual screw tensioning. If desired, a cyanoacrylate adhesive, or equivalent adhesive, may be placed between the liner and the lens to produce improved lens-to-frame retention and an improved index matching between the liner and the lens.

Although the triangular configuration of the liner illustrated in FIG. 5 is a standard configuration for most metal frames, the rectangular shape illustrated in FIG. 7 is also used, and it will be apparent that the present invention is not limited to any one cross-sectional shape. Further, although the preferred dimensions are illustrated in the drawings, it should be understood that the invention is not so limited. The primary purpose of the invention is to produce a resilient, stress-relieving lens liner for brittle, fracture-prone glass and/or plastic lenses by effectively replacing the fragile glass edge which was previously used to secure the lens in the frame. The tongue and groove matching between the liner and the lens aids in aligning the liner with the lens and, in turn, aids in positioning the lens with respect to the rim, as well as providing additional lens security. The specific liner material disclosed herein was selected for its numerous desirable properties; however, other materials may be used. For example, an elastomer having a lower hardness, down to about shore A 25, or a greater hardness, up to about Rockwell M 125, are useful as stress relievers. Furthermore, other elastomers which may not be optically clear, for example, may also be used and will meet the primary purpose of the invention.

Thus, there has been disclosed an improved safety liner for lenses that greatly reduces lens stress and which allows for irregularities in the contacting surfaces of a lens and a metal frame without damaging the lens. This is accomplished without altering the frame, while still allowing the lens to be easily mounted in the frame or removed therefrom while significantly improving the overall safety of the eyeglasses. Furthermore, the liner can be used to modify the diameter of the lens so that it will fit a frame that otherwise might be too large, thereby reducing manufacturing spoilage. Although the present invention has been described in terms of preferred embodiments, it will be apparent that numerous variations may be made without departing from the true spirit and scope thereof, as defined in the following claims:

What is claimed is:

1. A system for mounting an eyeglass lens in the rim of an eyeglass frame, comprising:
   rim means openable and closable to receive and secure a lens, said rim means defining a lens-receiving opening for receiving the peripheral edge of a lens;
   a circumferential, inwardly-opening groove having continuous beveled edges formed in said rim means;
   a composite lens having a glass layer and a plastic layer having facing inner surfaces joined by an elastomeric adhesive intermediate layer, said lens having an outer edge which is generally flat and nonbeveled, and which is equal to or smaller in diameter than said lens-receiving opening;
   a circumferential, outwardly-opening groove formed on said outer edge of said composite lens, at least a portion of said groove being between said glass and plastic layers;
   an elastomeric liner ring having a generally flat base wall and outwardly extending side walls, said ring having a nominal diameter smaller than the outer diameter of said lens and being elastically mounted on said outer edge of said lens with said side walls extending generally radially outwardly from said lens to form an outer peripheral liner edge for said lens, said ring side walls being beveled toward each other to form a liner which is generally triangular in cross-section, and which includes side walls which correspond to the shape of said rim inwardly-opening groove, said liner ring base wall being shaped to match said lens outer edge;
   a continuous, inwardly projecting circumferential tongue formed on the inner circumference of said liner ring base wall and having an inner nominal diameter smaller than the diameter of said lens groove, said tongue being shaped to engage said outwardly-opening groove on said lens when said liner is elastically mounted on said lens, said outer peripheral liner edge engaging said rim groove and said inner tongue engaging said lens groove when said rim is closed to thereby mount and secure said lens in said lens-receiving opening.

2. The system of claim 1, wherein said liner ring includes a base wall and first and second beveled walls, said tongue being formed on said base wall.

3. The system of claim 2, wherein said lens groove tapers outwardly.

4. The system of claim 1, further including adhesive means securing said liner ring means on said lens.

5. The system of claim 1, wherein said lens groove means is tapered outwardly from said intermediate layer to provide beveled edges on said glass and plastic layer inner surfaces.

6. The system of claim 1, wherein said liner ring material has a thickness sufficient to protect said lens against cracking and chipping due to stress applied by said rim when said lens is mounted in said lens-receiving opening.

7. The system of claim 1, wherein said liner ring means has a thickness sufficient to match the diameter of said lens to the diameter of said lens-receiving opening.

8. The system of claim 1, wherein said liner ring has a thickness of between 0.4 and 1.2 mm.

9. A system for mounting an eyeglass lens in the rim of an eyeglass frame, comprising:

rim means openable and closable to receive and secure a lens, said rim means defining a lens-receiving opening for receiving the peripheral edge of a lens;

a circumferential, inwardly-opening groove having continuous beveled edges formed in said rim means;

a lens having an outer edge which is generally flat and nonbeveled, and which is equal to or smaller in diameter than said lens-receiving opening;

a circumferential, outwardly-opening groove formed on said outer edge of said lens;

an elastomeric liner ring having a generally flat base wall and outwardly extending side walls, said ring having a nominal diameter smaller than the outer diameter of said lens and being elastically mounted on said outer edge of said lens with said side walls extending generally radially outwardly from said lens to form an outer peripheral liner edge for said lens, said ring side walls being continuously upwardly beveled toward each other to form a liner which is generally triangular in cross-section, and which includes side walls which correspond to the shape of said rim inwardly-opening groove, said liner ring base wall being shaped to match said lens outer edge shape;

a continuous, inwardly projecting circumferential tongue formed on the inner circumference of said liner ring base wall and having an inner nominal diameter smaller than the diameter of said lens groove, said tongue being shaped to engage said outwardly-opening groove on said lens when said liner is elastically mounted on said lens, said outer peripheral liner edge engaging said rim groove and said inner tongue engaging said lens groove when said rim is closed to thereby mount and secure said lens in said lens-receiving opening.

* * * * *